March 3, 1970          J. K. BEECHER          3,499,096
CONTAINER FOR ELECTRICAL COMPONENT
Filed Sept. 9, 1968
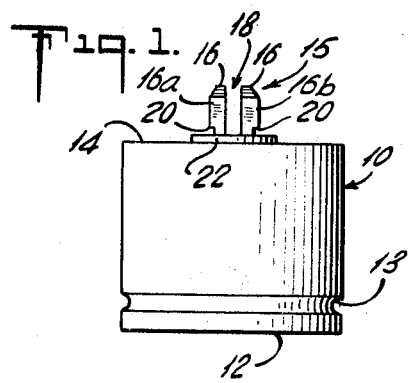
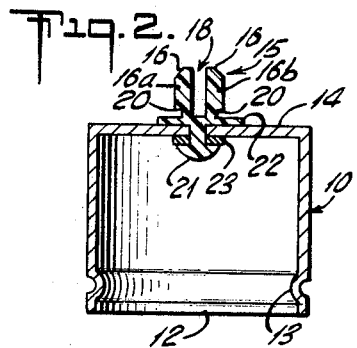
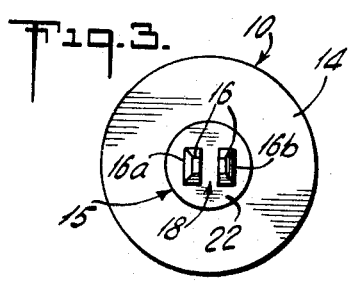
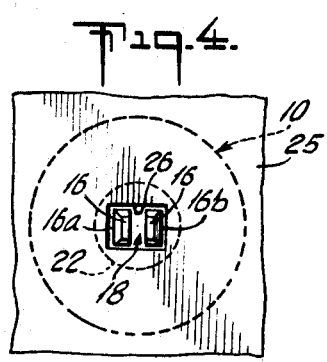
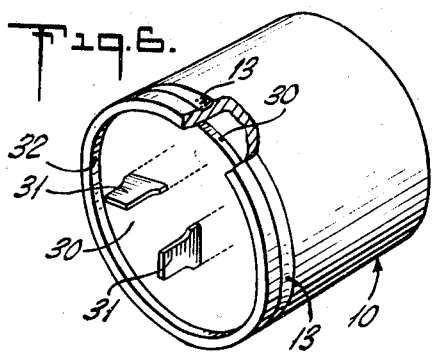
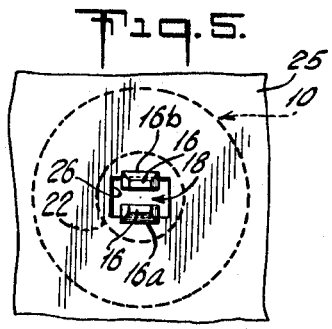
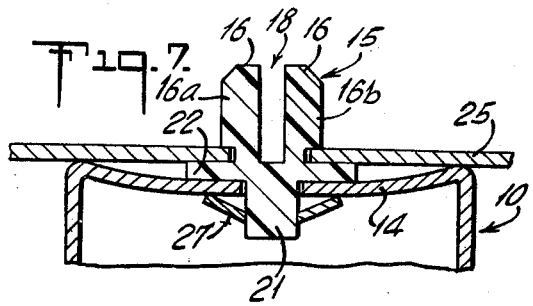
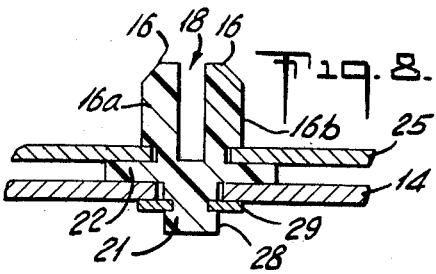
INVENTOR
JOEL K. BEECHER
BY
Eyre, Mann, & Lucas
ATTORNEYS

United States Patent Office 3,499,096
Patented Mar. 3, 1970

---

3,499,096
CONTAINER FOR ELECTRICAL COMPONENT
Joel K. Beecher, Morristown, N.J., assignor to Wagner Electric Corporation, a corporation of Delaware
Filed Sept. 9, 1968, Ser. No. 758,518
Int. Cl. H05k 5/04
U.S. Cl. 174—52          11 Claims

ABSTRACT OF THE DISCLOSURE

A container of conductive metal encloses an electrical component such as a flasher switch. A mounting device, molded of flexible plastic, is secured to a portion of the container for locking the assembly into an aperture in a supporting wall. The conductive metal container shields the component from stray electrical fields and provides a substantial protective envelope against dirt and humidity. The mounting device includes a bifurcated plastic lug which may be inserted into an aperture in a supporting wall and then turned to engage the aperture so as to hold the container in place.

---

This invention relates to a mounting means for small electrical devices as, for example, a flasher for directional signals or a relay for making and breaking an external circuit. The invention comprises a conductive metal casing which encloses the electrical unit and attached means for securing the assembly to a supporting wall by engaging an aperture therein. The electrical component is mounted on a base which can be retained in the open end of the metal container. This invention is an improvement on the cover member and mount described and claimed in application, Ser. No. 383,399, by J. K. Beecher, now Patent No. 3,272,908.

Directional signal flashers are in wide commercial use and have now been standardized for passenger automobiles. The usual flasher comprises elements mounted on a base of molded plastic material through which extend two or more terminals for connection to an external circuit. In order to secure the base to the metal container, a portion of the container may be crimped around the edge of the base. In order to attach the flasher or relay components to an external circuit, a socket may be used which contains connections within slots for making electrical connection to the terminals secured to the insulating base.

For a better understanding of the present invention and a preferred embodiment thereof, reference is made to the following description taken in connection with the accompanying drawings.

FIG. 1 is a side view of a combined metal container and plastic lug mount representing the preferred embodiment of the description taken in connection with the accompanying drawings.

FIG. 2 is a vertical sectional view through the device shown in FIG. 1.

FIG. 3 is a top plan view of the device shown in FIG. 2.

FIG. 4 is a plan view showing a part of a supporting wall with the lugs of the device of FIG. 1 inserted therein.

FIG. 5 is a view similar to Fig 4 but showing the parts in the locked position after rotation of the device through 90 degrees.

FIG 6 is a perspective view of the device shown in FIG. 1 with parts broken away to show the base mechanically locked to the metal container and to show the connecting terminals.

FIG. 7 is a cross-sectional view to an enlarged scale showing one method of securing the molded lug member to the metal container.

FIG. 8 is a view similar to FIG. 7 showing an alternate method of securing the lug member to the metal container.

Referring now to FIGURES 1, 2 and 3, the combined container and lug mount comprises metal container 10 having an open end 12 within which an inwardly-extending peripheral protrusion 13 has been formed, having an annular configuration in the embodiment shown. The closed upper end 14 is formed with an axial hole into which a lug mount 15 is secured. The lug mount 15 includes a lug 16 comprising bifurcations 16a and 16b separated by a gap 18 which permits movement of the bifurcations 16a and 16b toward each other when the container 10 is mounted to a wall. These bifurcations 16a and 16b each include an undercut portion 20 which serves as a means for locking the entire assembly into a wall aperture and also permits easier flexing of the bifurcations.

The lug mount 15 is terminated by an axial coupling rod 21 which extends through the hole in the closed upper end 14 of container 10. In order to provide a locking member for engaging both container 10 and the mounting surface, a flange 22 is formed at the base of bifurcations 16a and 16b exterior to container 10. The rod 21 which extends through the hole may be secured in a number of ways. It may be surrounded by a layer of plastic cement, for instance, or it may be secured by heat staking either with a washer 23 as shown in FIG. 2 or without a washer. To carry out the formation of a securing member by heat staking, a hot concave tool is pressed against the end of the thermoplastic coupling rod 21 and it is forced into the position shown in FIG. 2. The rod 21 may have any cross-section, but it is preferred to use a square rod to engage square hole so that the lug mount 15 cannot turn relative to the metal container 10. Two other methods of securing the lug mount to the metal container are illustrated in greater detail in FIGS. 7 and 8.

Referring now to FIGURES 4 and 5, the container 10 and lug mount 15 are designed to be manually secured to a wall 25. In FIG. 4, the container is positioned against the wall 25 and the two bifurcations 16a and 16b are inserted through an oblong hole 26. In order to secure the container to the wall, it is turned through a right angle so that the bifurcations 16a and 16b are positioned as shown in FIG. 5 with the upper and low edges of hole 26 engaging slots 20 in the bifurcations. This simple manual operation is all that is necessary to secure the container to the wall. It should be noted that the slots 20 in the two bifurcations are cut rectangularly so that after the manual mounting operation, they are secured permanently to the wall and cannot be disengaged by any normal level of vibration of an automobile or of any other supporting structure.

FIG. 6 is a perspective view showing how the electrical components are enclosed by the container. All the components are secured to an insulating base 30 which includes one or more connecting terminals 31. The base 30 is held in place by the inwardly-extending peripheral protrusion 13 in container 10 which impinges against the inner periphery of the base 30 and by a turned-in portion 32 of container 10 which impinges against the outer periphery of base 30. The turned-in portion 32 may be formed by spinning or staking.

Referring now to FIG. 7, the plastic lug mount 15 is shown with its coupling rod 21 extending through a hole in the end portion 14 of container 10 as before, but in this embodiment the end portion 14 has been formed with a concave surface so that the base of the mount 22 is below the edge of the container 10. When the assembly is mounted on a wall 25, the edges of the metal container 10 are in contact with the wall and provide a much firmer support by exerting a downward force which causes the upper surfaces of undercut portions 20 to bear against the upper surface of wall 25 with greater pressure. The mount 15 is secured to end portion 14 by means of a thin metal washer 27 which is forced on to the rod 21 so that its inner edge grips the plastic surface and holds it securely in place.

Referring now to FIG. 8, the lug mount 15 is shown with the coupling rod 21 formed with an annular slot 28. The mount 15 is secured to the metal end portion 14 by means of a resilient split washer 29.

The advantages of the present invention will be apparent to those skilled in the art, as well as changes which could be made in the foregoing embodiments without departing from the spirit and scope of the invention. Therefore, it should be understood that the present invention is not to be limited to the foregoing description of the specific embodiments thereof, but is to be determined by the spirit and scope of the accompanying claims.

What is claimed is:

1. A container-mount combination for an electrical component comprising:
   (1) a conductive metal container having a closed end adapted to receive a mounting device and an open end for receiving an electrical component, an inwardly-extending peripheral protrusion being formed in said container in proximity to said open end which is adapted to receive a mounting base adapted to support an electrical component; and
   (2) a unitary molded plastic mounting device including a mounting lug, a coupling rod, and securing means disposed about said coupling rod connecting said lug to said conductive metal container.

2. The combination according to claim 1 wherein said mounting lug is bifurcated and extends from the coupling rod in a substantially axial direction.

3. The combination according to claim 1 wherein said coupling rod is thermoplastic and said securing means comprises a heat-staked element integral with said coupling rod.

4. The combination according to claim 3 further comprising a washer surrounding said coupling rod and being situated between said closed end of said container and said heat-staked element.

5. The combination according to claim 1 wherein said securing means includes a flexible washer adapted to be forced into frictional engagement with the coupling rod.

6. The combination according to claim 1 wherein said securing means includes an annular slot formed in said coupling rod and a split resilient washer in the slot and engaging the inside surface of the metal container.

7. The combination according to claim 1 wherein the cross-section of said coupling rod substantially corresponds to the shape of said hole in said closed end of said container.

8. The combination according to claim 7 wherein said hole in said closed end of said container is square.

9. The combination according to claim 1 wherein the closed end portion of the metal container is formed concavely with respect to the surface against which the container-mount combination is to be mounted.

10. The combination according to claim 1 further including a base adapted to support an electrical component, said base being formed of insulating material and having a plurality of conductive metal lugs extending therefrom for connection to an external circuit.

11. The combination according to claim 10 wherein said base is retained in position in said open end of said container by said inwardly-extending peripheral protrusion and by a peripheral portion of said container situated at said open end, said peripheral portion being mechanically deformed so as to press said base against said inwardly-extending peripheral protrusion.

References Cited

UNITED STATES PATENTS

| | | |
|---|---|---|
| 2,041,336 | 5/1936 | Hall. |
| 2,343,675 | 3/1944 | Kenyon. |
| 3,272,908 | 9/1966 | Beecher _____ 174—52 |

LEWIS H. MYERS, Primary Examiner

D. A. TONE, Assistant Examiner

U.S. Cl. X.R.

248—27